United States Patent [19]

Baker et al.

[11] 4,169,917
[45] Oct. 2, 1979

[54] ELECTROCHEMICAL CELL AND SEPARATOR PLATE THEREOF

[75] Inventors: Bernard S. Baker, Brookfield Center; Dilip J. Dharia, Danbury, both of Conn.

[73] Assignee: Energy Research Corporation, Danbury, Conn.

[21] Appl. No.: 923,369

[22] Filed: Jul. 10, 1978

[51] Int. Cl.² ............................................. H01M 8/04
[52] U.S. Cl. ........................................ 429/26; 429/34; 429/72; 429/129; 429/39
[58] Field of Search ...................... 429/26, 34, 39, 72, 429/129, 120; 165/166, 167

[56] References Cited

U.S. PATENT DOCUMENTS

| 3,394,032 | 7/1968 | Danner | 429/26 |
| 3,761,316 | 9/1973 | Stedman | 429/26 |
| 3,779,811 | 12/1973 | Bushnell et al. | 429/26 |
| 3,801,374 | 4/1974 | Dews et al. | 429/26 |
| 3,880,670 | 4/1975 | Shinn | 429/34 X |
| 3,923,546 | 12/1975 | Katz et al. | 429/26 X |
| 3,964,930 | 6/1976 | Reiser | 429/26 |

*Primary Examiner*—Anthony Skapars
*Attorney, Agent, or Firm*—Watson, Leavenworth, Kelton & Taggart

[57] ABSTRACT

A fuel cell includes a separator plate having first and second flow channels extending therethrough contiguously with an electrode and respectively in flow communication with the cell electrolyte and in flow isolation with respect to such electrolyte. In fuel cell system arrangement, the diverse type channels are suplied in common with process gas for thermal control purposes. The separator plate is readily formed by corrugation of integral sheet material.

11 Claims, 10 Drawing Figures

ELECTROCHEMICAL CELL AND SEPARATOR PLATE THEREOF

The invention described herein was made in the course of, or under, Department of Energy Contract No. EY-76-C-03-1196 with Energy Research Corporation.

FIELD OF THE INVENTION

This invention relates to electrochemical cells, such as fuel cells and batteries of type wherein reactant or product gas is conducted to or from the cells. The invention relates more particularly to thermal control for such cells.

BACKGROUND OF THE INVENTION

In the design of fuel cells and like electrical energy producing devices involving reactant or product gas undergoing electrochemical reaction (process gas), thermal control is a dominant parameter. The electrochemical reactions in such devices are invariably accompanied by heat generation or heat absorpotion because of entropy changes accompanying the reaction and irreversibilities caused by diffusion and activation overpotentials and ohmic resistance. In the accommodation of thermal control, the art has looked to various techniques, none of which are entirely satisfactory.

The thermal control technique seemingly most desirable takes advantage of the sensible heat of the process gas itself as a vehicle for thermal control. Thus, if removal of heat from the cell is desired, the incoming process gas may be supplied to the cell at a temperature lower than the cell operating temperature such that exiting gas removes heat simply by increase in temperature thereof in passage through the cell. In this technique, one adjusts the process gas flow level above the flow level required for production of preselected measure of electrical energy, such additional process gas serving the heat removal function. Disadvantages attending this practice include undesirable pressure drops based on the increased process gas flow, auxiliary power penalty and loss of electrolyte through vaporization or entrainment. By auxiliary power is meant the power requirements of apparatus accessory to the fuel cell proper, e.g., gas pumps, pressurizing systems and the like. As respects electrolyte loss, all process gas in this gas sensible heat technique is in communication with the cell electrolyte in its passage through the cell and, where substantial additional gas is required for thermal control, a very high electrolyte loss due to saturation of the gas with electrolyte vapor is observed in electrolyte gas resulting in quite high electrolyte loss.

In a second thermal control technique, the art has looked to limiting the temperature gradients inside fuel cells by employment of a bipolar having an extended fin disposed outside the cell proper, as shown in U.S. Pat. No. 3,623,913 to Adlhart et al. While this technique provides a somewhat more uniform cell temperature, high gas flow passing directly through the cell can result in high electrolyte loss and increased auxiliary power.

A third thermal control technique relies on the sensible heat of a dielectric liquid. Such sensible-heat liquid approach requires much lower auxiliary power as compared to the gaseous heat transfer medium, but requires a separate heat transfer loop and an electrically isolated manifolding system. To avoid shunt currents between stacked cells, dielectric fluids such as fluorocarbon or silicon-based oils have been traditionally used as the heat transfer media. Because the catalyst material may be poisoned severely by even a trace amount of these dielectric fluids, a small leak from the heat transfer loop may be fatal to the cell. Also, the dielectric liquids are flammable and have toxic reaction products.

In a fourth technique for thermal control, the art has relied on the latent heat of liquids. Latent heat liquids (U.S. Pat. No. 3,761,316 to Stedman; and U.S. Pat. No. 3,969,145 to Grevstad et al.) can provide heat transfer at nearly uniform temperature, although there may be some temperature gradients in the stacking direction if the heat transfer plate is placed between a group of cells. The auxiliary power requirements are expected to be low. Suitable dielectric fluids having boiling points in the range of cell operating temperature can be used, but the disadvantages of the sensible-heat liquid approach apply here also. To overcome these disadvantages, non-dielectric media, such as water, can be used. If water is used, a suitable quality steam can be generated for use in other parts of the plant. External heat exchange also is expected to be efficient because of high heat transfer coefficients. Unfortunately, the use of a non-dielectric liquid necessitates elaborate corrosion protection schemes (U.S. Pat. No. 3,969,145 to Grevstad et al.; U.S. Pat. No. 3,923,546 to Katz et al.; U.S. Pat. No. 3,940,285 to Nickols et al.) and/or the use of an extremely low conductivity liquid. During operation, the conductivity may increase, so means to restore the low conductivity may also be required. If the cooling loop is under pressure, good seals are necessary. If a leak develops during the life of the stack because of pinholes caused by corrosion or deterioration of seals, it could paralyze the entire system. Because of the corrosion protection requirements and intricate manifolding, the cost of the heat transfer subsystem operating on dielectric coolant could be substantial.

In U.S. patent application, Ser. No. 923,368 filed July 10, 1978, commonly-assigned herewith and filed on even date, a fundamentally different approach to thermal control of fuel cells is set forth which provides for supplementing the flow of process gas through an electrochemical cell, in measure required for thermal control by sensible heat of process gas, in manner both avoiding electrolyte loss and pressure drop increase across the cell. In implementing this process gas sensible-heat technique, the invention of such commonly-assigned application introduces, in addition to the customary process gas passage in communication with the cell electrolyte, a process gas passage in the cell which is isolated from the cell electrolyte and in thermal communication with a heat-generating surface of the cell. Such electrolyte-communicative and electrolyte-isolated passages are commonly manifolded to a pressurized supply of process gas. The flow levels in the respective passages are set individually by passage parameters to provide both for desired level electrical energy cell output and desired heat removal.

SUMMARY OF THE INVENTION

It is an object of the present invention to provide improved electrochemical cell structure for implementing such last-mentioned thermal control technique involving sensible heat of process gas.

In attaining the foregoing and other objects, the invention provides an electrochemical cell comprising an electrolyte layer, an electrode contiguous with the electrolyte layer and plate structure having first flow passages in flow communication with the electrolyte through the electrode and second passages which are in flow isolation with respect to the electrolyte, the second passages being bounded by surface contiguous with the electrode. Such plate structure is preferably realized by a corrugated sheet member having first channels open with respect to the electrode, thereby constituting such first flow passages and second channels successive to the first channels and having crests contiguous with the electrode, thereby constituting such second flow passage.

The foregoing and other objects and features of the invention will be further understood from the following detailed discussion therof and from the drawings wherein like reference numerals identify like parts throughout.

DESCRIPTION OF EXPLANATORY PREFERRED EMBODIMENTS AND PRACTICES

Figure 1:
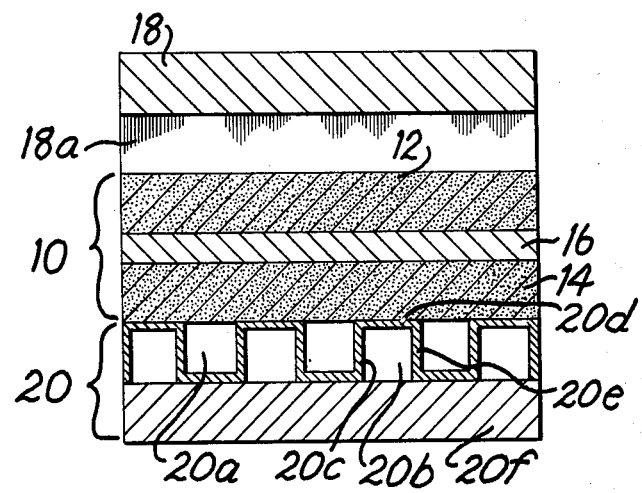
FIG. 1 is a sectional drawing of an explanatory embodiment of an electrochemical cell in accordance with the invention, as seen from plane I—I of FIG. 2.
Figure 2:
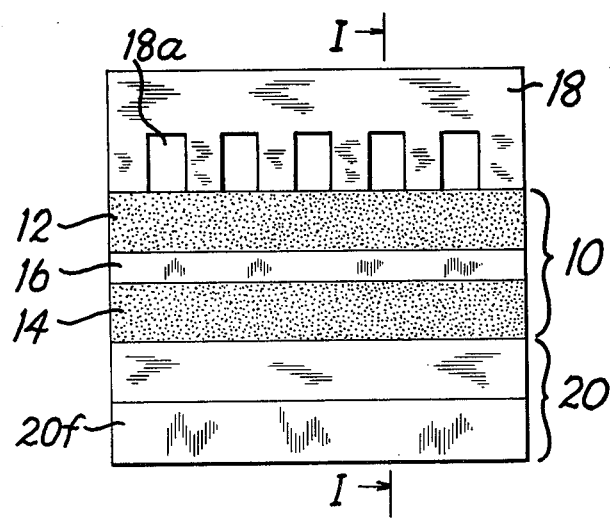
FIG. 2 is a side elevation of the FIG. 1 cell.

Referring to FIGS. 1 and 2, fuel cell 10 includes anode and cathode electrodes 12 and 14, of gas diffusion type, and electrolyte matrix or layer 16 therebetween. Separator plate 18 is of design having channel passages 18a, for supplying process gas to anode electrode 12, all in flow communication with the electrolyte. Separator plate 20 is constructed to implement this invention and, as shown in the explanatory FIG.1 single cell embodiment, is of unipolar character, having channel passages 20a, for supplying process gas to cathode electrode 14. Based on the gas diffusion character of electrodes 12 and 14, passages 18a and 20a constitute electrolyte-communicative passages.

Passages 20b of separator plate 20 are in flow isolation with respect to cathode electrode 14, the boundary walls 20c, 20d and 20e of the passages being essentially impermeable to gas, wall 20d being contiguous with electrode 14. Plate 20f is juxtaposed with passages 20b to close the same. Accordingly, passges 20b are in flow isolation with respect to electrolyte 16, and process gas supplied to passages 20b can be conducted through the fuel cell to serve thermal control purposes without contributing to electrolyte loss. To the contrary, process gases conducted through passages 18a and 20a give rise to exit gas unavoidably partially saturated with electrolyte vapor. In the illustrated embodiment, passages 20a and 20b are alternately successive in a common plane location as one progresses across that surface of electrode 14 which is contiguous with the crests 20d of electrolyte-isolated passage 20b.

In the above-referenced commonly-assigned application, unipolar separator plates, such as plate 18 are used adjacent each of the cell electrodes of a fuel cell. Supplemental process gas to be conducted through electrolyte-isolated passages for thermal control is fed through conduits of further plates which are spaced from the electrodes by the unipolar separator plates. In such particularly disclosed embodiment of the referenced application, such conduit-defining further plates are employed in one cell of a succession of cells forming a stack. Since heat removal thus is affected by sensible heat of supplemental process gas at somewhat spaced sites, the possibility exists for thermal gradients to be present in substantial measure. Such disadvantage is overcome by the presently disclosed schemes wherein thermal gradients are reduced since heat removal may now be accomplished, as desired, from heat-generating surface of each cell.

Figure 3:
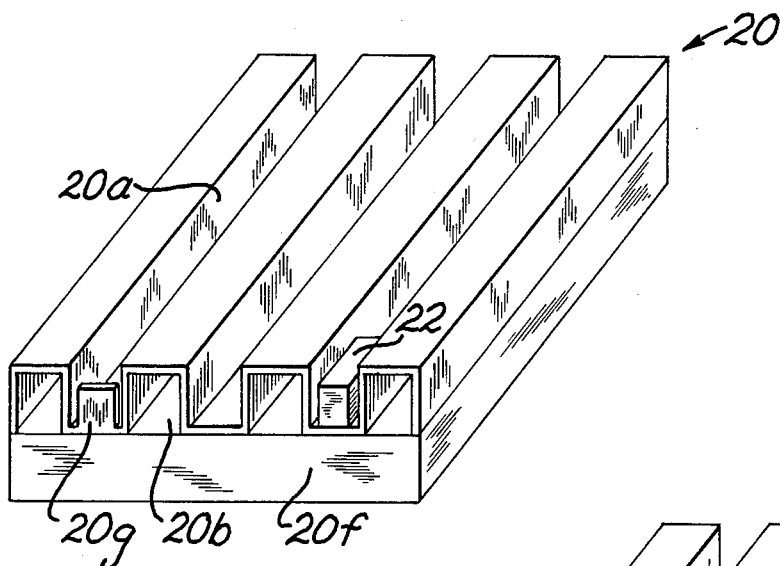
FIG. 3 is a perspective showing of the separator plate of the invention as employed in the cell of FIGS. 1 and 2.

The unipolar embodiment of separator plate 20 is readily formed by the use of integral sheet material and corrugation of same to form channels defining the respectively diverse passages. While the channels are shown as symmetric in FIGS. 1-3, they can be preselected to have different cross-sectional areas in accordance with the ratio of flows therethrough needed to achieve intended heat removal and electrical energy output. Typically, the flow through electrolyte-isolated passages may be five times that through electrolyte-communicative passages. The practice of achieving desired flows in the respective passages may include variation of size and geometry of the flow passages and/or the placement of fixed or variably-settable constrictions in either or both passages. As is shown by way of example in FIG. 3, a partial end wall 20g may be formed in channel 20a, or block-type obstacle 22 may be included therein.

Figure 4:
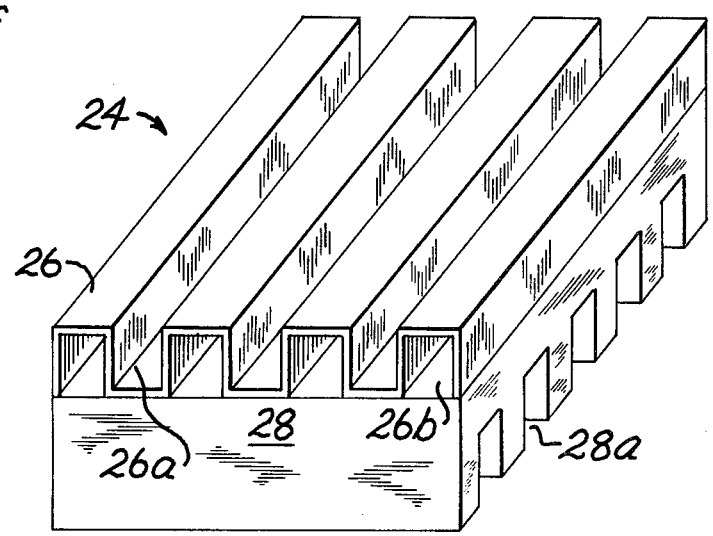
FIGS. 4 and 5 are perspective showings of bipolar separator plates in accordance with the invention.
Figure 5:
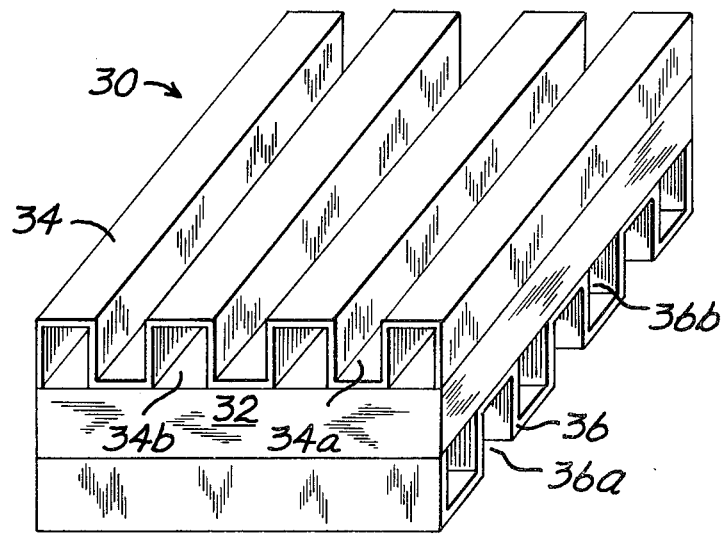
Figure 6:
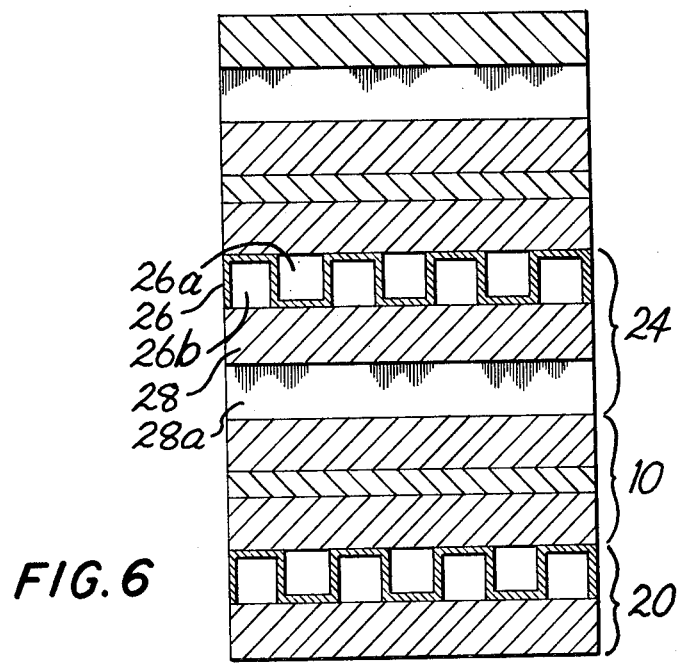
FIG. 6 is a sectional drawing of a fuel cell stack employing separator plates in accordance with the invention.

Referring to FIGS. 4 and 5, bipolar plates are shown for implementing the invention. In both such plates, elongate passages extend lengthwise with opposed surfaces of the plates. In FIG. 4, bipolar plate 24 includes a corrugated sheet member 26 disposed atop a plate 28 which defines channel passages 28a for process gas, the passges opening into the plate bottom surface. Member 26 has passages 26a (electrolyte-communicative), opening into the plate top surface, and 26b (electrolyte-isolated), extending parallel, to passages 26a. Such FIG. 4 plate is shown in stack usage in the fuel cell stack of FIG. 6.

In bipolar plate 30 of FIG. 5, backing plate 32 supports corrugated sheet members 34 and 36 and closes the electrolyte-isolated passages 34b and 36b thereof. Crisscross electrolyte-communicative passages 34a and 36a serve electrodes juxtaposed therewith (not shown) with process gases.

The invention may be practiced generally in any electrochemical cell having a reactant gas and is particularly adapted to fuel cell usage, such as phosphoric acid fuel cells wherein the process gas used also in thermal control is the cathode gas and/or hydrogen-rich anode gas, and molten carbonate fuel cells wherein the process gas used also in thermal control is air/carbon dioxide cathode gas mixture and/or hydrogen-rich anode gas mixture.

Figure 7A:
FIGS. 7 (a)-(d) are schematic showings of other embodiments of separator plates in accordance with the invention.
Figure 7B:
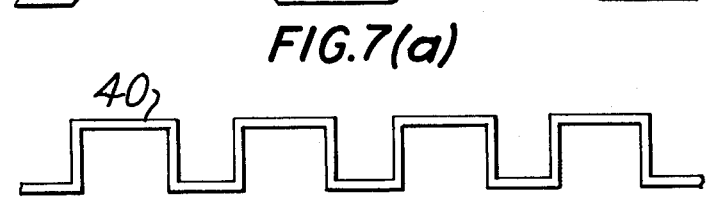
Figure 7C:
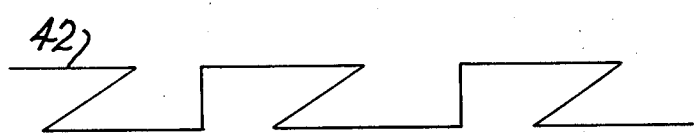
Figure 7D:

As will be appreciated, various changes may be introduced in the foregoing embodiments without departing from the invention. Thus, passage geometry may be varied extensively, as is shown by corrugated sheet members 38-44 illustrated schematically in FIGS. 7(a)-

(d). The particularly disclosed embodiments and practices are thus intended in an illustrative and not in a limiting sense. The true spirit and scope of the invention is set forth in the following claims.

What is claimed is:

1. An electrochemical cell comprising an electrolyte, an electrode contiguous with said electrolyte and plate structure defining first flow passages in flow communication with said electrolyte and second flow passages in flow isolation with respect to said electrolyte and said second passages being bounded by surface thereof contiguous with said electrode.

2. The cell claimed in claim 1 wherein said first flow passages are separated from one another by said second flow passages alternately progressively across a surface of said electrode with which said second flow passages have such contiguous bounding surface.

3. The cell claimed in claim 2 wherein integral sheet material defines both said first and second flow passages.

4. The cell claimed in claim 3 wherein a corrugated sheet member defines first channels open with respect to said electrode and juxtaposed therewith to constitute said first flow passages and defines second channels successive to said first channels and having crests contiguous with said electrode to constitute said second flow passages.

5. The cell claimed in claim 4 further including a plate member contiguous with the crests of said first channels and serving to close said second channels along the length thereof.

6. A separator plate for an electrochemical cell stack, said separator plate having opposed first and second surfaces, first elongate passages opening lengthwise into said first surface, second elongate passages opening lengthwise into said second surface and third elongate passages enclosed lengthwise by second surface.

7. The separator plate claimed in claim 6 further including fourth elongate passages enclosed lengthwise by said first surface.

8. The separator plate claimed in claim 6 wherein integral sheet material defines said second and third passages.

9. The separator plate claimed in claim 8 wherein said sheet material is corrugated and wherein crests of such corrugated sheet material define said second surface.

10. The separator plate claimed in claim 9 comprising a backing plate juxtaposed with said corrugated sheet material.

11. The separator plate claimed in claim 6 wherein said first passages extend through said plate in a first direction and wherein said second and third passages extend through said plate in a second direction crisscross to said first direction.

* * * * *